United States Patent
Moens

(10) Patent No.: US 8,901,250 B2
(45) Date of Patent: Dec. 2, 2014

(54) LOW TEMPERATURE CURE POWDER COATING COMPOSITIONS

(75) Inventor: Luc Moens, Sint-Genesius-Rode (BE)

(73) Assignee: Allnex Belgium S.A., Brussels (BE)

( * ) Notice: Subject to any disclaimer, the term of this patent is extended or adjusted under 35 U.S.C. 154(b) by 189 days.

(21) Appl. No.: 13/382,343

(22) PCT Filed: Jun. 28, 2010

(86) PCT No.: PCT/EP2010/059123
§ 371 (c)(1),
(2), (4) Date: Jan. 5, 2012

(87) PCT Pub. No.: WO2011/003761
PCT Pub. Date: Jan. 13, 2011

(65) Prior Publication Data
US 2012/0107629 A1  May 3, 2012

(30) Foreign Application Priority Data
Jul. 7, 2009  (EP) .................................... 09164810

(51) Int. Cl.
*B05D 3/02*  (2006.01)
*B32B 15/09*  (2006.01)
*B32B 27/36*  (2006.01)
*C08L 67/02*  (2006.01)
*C08L 67/04*  (2006.01)
*C09D 167/02*  (2006.01)
*C08L 33/06*  (2006.01)

(52) U.S. Cl.
CPC ............... *C08L 67/02* (2013.01); *C08L 33/068* (2013.01); *C09D 167/02* (2013.01)
USPC ........ 525/111; 427/385.5; 427/386; 428/413; 428/418; 428/458; 428/480; 525/173; 525/174; 525/176

(58) Field of Classification Search
None
See application file for complete search history.

(56) References Cited

U.S. PATENT DOCUMENTS

| 4,499,239 | A | | 2/1985 | Murakami et al. | |
|---|---|---|---|---|---|
| 5,270,391 | A | * | 12/1993 | Miyazaki et al. | 525/194 |
| 6,093,774 | A | * | 7/2000 | Dumain | 525/207 |
| 6,635,721 | B1 | * | 10/2003 | Moens et al. | 525/438 |
| 6,844,072 | B2 | * | 1/2005 | Moens et al. | 428/413 |
| 2003/0153640 | A1 | | 8/2003 | Moens et al. | |
| 2003/0166793 | A1 | * | 9/2003 | Moens et al. | 525/444 |
| 2004/0087736 | A1 | * | 5/2004 | Wu et al. | 525/438 |

FOREIGN PATENT DOCUMENTS

| JP | 3-153771 | 7/1991 |
|---|---|---|
| WO | 02/055620 | 7/2002 |

OTHER PUBLICATIONS

International Search Report issued Oct. 21, 2010 in International (PCT) Application No. PCT/EP2010/059123.

* cited by examiner

*Primary Examiner* — Robert Sellers
(74) *Attorney, Agent, or Firm* — Wenderoth, Lind & Ponack, L.L.P.

(57) ABSTRACT

The present invention relates to a powder coating composition for low temperature cure which comprises a mixture of a carboxylic acid group containing first polyester; at least one of a second polyester having a glass transition temperature $\leq 45°$ C. and/or a crystalline polycarboxylic acid; a glycidyl group containing acrylic copolymer; a further compound and/or resin having functional groups readable with the carboxylic acid groups; and a thermosetting curing catalyst. These thermosetting powder coatings are designed for coating heat-sensitive substrates such as wood, fiber board and other materials which can not withstand the excessive heat/time conditions necessary to cure traditional coatings. The powder coatings of the invention, when cured at temperatures below 150° C., produce a finish which exhibits a high gloss, smooth surface along with an outstanding hardness and weatherability.

22 Claims, No Drawings

LOW TEMPERATURE CURE POWDER COATING COMPOSITIONS

This application is a U.S. national stage of International Application No. PCT/EP2010/059123 filed Jun. 28, 2010.

Powder coatings which are dry, finely divided, free flowing, solid materials at room temperature, have gained popularity in recent years over liquid coatings. Despite their many advantages, nowadays thermosetting powder coatings generally are cured at temperatures of at least 150° C.

Below this recommended temperature the coatings have poor appearance, as well as poor physical and chemical properties.

In consequence of this restriction powder coatings are generally not employed in coating heat-sensitive substrates such as medium density fibreboard (MDF) and plastics. Besides, there are the heavy metal pieces where conventional powder coatings require extremely long curing times in order to get the coating fully cured, conditions which are totally inconvenient from energetic point of view.

Recently there has been a good deal of effort in finding powder coatings that cure at lower temperature. Powder coating compositions developed thus far, either are developed for conventional curing schedules or, at low curing temperatures, present drawbacks or limitations when a combination of performances such as a smooth aspect along with a good surface hardness are desired.

Therefore there is provided a powder coating composition for low temperature cure which comprises a mixture of:
- at least one carboxylic acid group containing first polyester A;
- at least one component B selected from the group consisting of
  - at least one second polyester B1 having a glass transition temperature ≤+45° C. and/or
  - at least one crystalline polycarboxylic acid B2;
- at least one glycidyl group containing acrylic copolymer C;
- at least one compound and/or resin D, different from compound C, having functional groups reactable with the carboxylic acid groups; and
- at least one thermosetting curing catalyst E.

By "low temperature cure" is meant to designate curing at temperatures of from 100° C. to 150° C. Upon application and curing at those temperatures coating compositions of the invention permit to obtain very smooth, high gloss finishes, proving good hardness, solvent resistance and resistance to weathering.

The carboxylic acid group containing first polyester A of the invention in general has an acid number of at least 15, preferably at least 20, more preferably at least 22 mg KOH/g. The acid number of this first polyester A in general is at most 70, preferably at most 50, more preferably at most 35 mg KOH/g. Advantageously this first polyester A has a hydroxyl number of less than 15 mg KOH/g.

The acid constituent of the first polyester A in general is composed of from 50 to 100 molar percent of terephthalic and/or isophthalic acid, and of from 0 to 50 molar percent of another diacid constituent selected from one or more aliphatic, cycloaliphatic and/or aromatic diacids, such as: fumaric acid, maleic acid, phthalic anhydride, 1,4-cyclohexanedicarboxylic acid, 1,3-cyclohexanedicarboxylic acid, 1,2-cyclohexanedicarboxylic acid, succinic acid, adipic acid, glutaric acid, pimelic acid, suberic acid, azelaic acid, sebacic acid, 1,12-dodecanedioic acid, trimellitic acid, pyromellitic acid, or the corresponding anhydrides.

The glycol constituent of the first polyester A in general is composed of from 40 to 100 molar percent of neopentyl glycol, and from 0 to 60 molar percent of another glycol constituent selected from one or more aliphatic and/or cycloaliphatic glycols, such as: ethylene glycol, propylene glycol, 1,4-butanediol, 1,6-hexanediol, 1,4-cyclohexanediol, 1,4-cyclohexanedimethanol, 2-methyl-1,3-propanediol, 2-butyl-2-ethyl-1,3-propanediol, hydrogenated Bisphenol A, hydroxypivalate of neopentyl glycol, trimethylolpropane, ditrimethylolpropane, pentaerythritol. Also suitable are diethylene glycol and/or 1,3-propanediol.

The carboxyl functional first polyester A of the present invention advantageously has a number averaged molecular weight (Mn) as determined by gel permeation chromatography (GPC) of at least 1100, preferably at least 1600. The Mn of this first polyester A preferably is at most 15000, more in particular is at most 7500, as determined by GPC (using polystyrene standards and tetrahydrofuran as eluent, at 40° C.).

The carboxyl functional first polyester A of the invention advantageously has a glass transition temperature, measured by Differential Scanning Calorimetry (DSC) according to ASTM D3418 with a heating gradient of 20° C. per minute, of from +45 to +100° C. Preferably this first polyester A has a glass transition temperature above +45° C., more preferably above +50° C.

The carboxyl functional first polyester A of the invention advantageously has a Brookfield cone and plate viscosity according to ASTM D4287-88, measured at 200° C., ranging from 5 to 15000 mPa·s.

Advantageously the carboxyl functional first polyester A of the present invention is an amorphous polyester.

Preferably the carboxyl functional first polyester A of the invention is present in an amount of from 40 to 97% by weight, based on the total weight of the binder. Preferably the amount is at least 60% by weight, and preferably at most 85% by weight.

The (optional) second polyester B1 of the invention in general has an acid number of from 0 to 50 mg KOH/g. The hydroxyl number of this second polyester B1 in general is from 0 to 100 mg KOH/g.

Preferably the acid number of this second polyester B1 is at least 5, and preferably at most 30 mg KOH/g.

Preferably the hydroxyl number of this second polyester B1 is at least 5, more in particular at least 10 mg KOH/g. Preferably the hydroxyl number of this second polyester B1 is at most 50, more in particular at most 35 mg KOH/g.

The acid constituent of the (optional) second polyester B1 of the invention in general is composed of a dicarboxylic acid, optionally in combination with a monocarboxylic acid. The dicarboxylic and monocarboxylic acids may be selected from one or more of: terephthalic acid, isophthalic acid, phthalic anhydride, 1,2-cyclohexanedicarboxylic acid, 1,3-cyclohexanedicarboxylic acid, 1,4-cyclohexanedicarboxylic acid, succinic acid, adipic acid, glutaric acid, pimelic acid, suberic acid, azelaic acid, sebacic acid, 1,10-decanedioic acid, 1,11-undecanedioic acid, 1,12-dodecanedioic acid, 1,13-tridecanedioic acid, 1,14-tetradecanedioic acid, 1,15-pentadecanedioic acid, 1,16-hexadecanedioic acid, fumaric acid, maleic anhydride, benzoic acid, tert.butylbenzoic acid, hexahydrobenzoic acid or saturated aliphatic monocarboxylic acids.

The alcohol constituent of the (optional) second polyester B1 of the invention in general is composed of a diol optionally in combination with a monoalcohol. The diol and the monoalcohol may be selected from one or more of: propylene glycol, neopentyl glycol, 2-methyl-1,3-propanediol, 2-butyl-2-ethyl-1,3-propanediol, hydroxypivalate of neopentyl glycol, ethylene glycol, 1,3-propanediol, 1,4-butanediol, 1,5-pentanediol, 1,6-hexanediol, 1,7-heptanediol, 1,8-octanediol, 1,9-nonanediol, 1,10-decanediol, 14-tetradecanediol, 1,16-hexadecanediol, 1,4-cyclohexanediol, 1,4-cyclohexanedimethanol, hydrogenated Bisphenol A, 2,2,4,4-tetramethyl-1,3-cyclobutanol or 4,8-bis(hydroxymethyl)tricyclo [5.2.1.0]decane, octanol, 2-ethylhexanol, isodecylalcohol, cyclohexanol, pentanol, hexanol or benzylalcohol. Another example of a suitable diol is diethylene glycol.

The (optional) second polyester B1 of the invention may be an amorphous or a semi-crystalline polyester.

The (optional) second polyester B1 of the present invention in general has a number averaged molecular weight (Mn) of at least 700, more preferably at least 1400, as measured by GPC. Preferably the Mn of this second polyester B1 is at most 17000, more in particular at most 11500, as measured by GPC.

By "second" is meant that the polyester B1 is different from the "first" polyester A.

The (optional) second polyester B1 of the invention advantageously has a glass transition temperature (Tg) that is lower than the Tg of the first polyester A. In general the Tg of the of second polyester B1 ranges from −100 to +45° C., as measured by DSC. In general this Tg is lower than +45° C. The Tg of this second polyester B1 can be below +40° C. Preferably the Tg of this second polyster B1 is at least −50° C., more in particular at least −25° C.

The (optional) second polyester B1 of the invention in general has a Brookfield (cone/plate) viscosity of from 10 mPa·s, measured at 100° C., to 10000 mPa·s, measured at 200° C.

According to an embodiment of the invention, the (optional) second polyester B1 is a carboxylic acid group containing polyester. Possibly this carboxylic acid group containing second polyester B1 is further reacted with a monoepoxide such as for example ethylene oxide, propylene oxide, monocarboxylic acid glycidyl ester (e.g. Cardura E) and/or phenylglycidyl ether.

According to another embodiment of the invention, the (optional) second polyester B1 is a hydroxyl group containing polyester. Possibly this hydroxyl group containing polyester is further reacted with a monoisocyanate such as n-butyl isocyanate, dodecyl isocyanate, octadecyl isocyanate, cyclohexyl isocyanate, benzyl isocyanate, and/or phenyl isocyanate.

According to yet another embodiment of the invention the (optional) second polyester B1 of the present invention is an uncondensed polyester, optionally comprising carboxylic acid groups.

Preferably the (optional) second polyester B1 of the present invention has a functionality, more in particular an acid functionality, that is lower than 2, preferably lower than 1.5. In general the functionality, more in particular the acid functionality, is at least 0.3, more in particular at least 0.5. Most preferably the acid functionality is 1.

The polyesters A and B1 of the invention can be prepared using conventional esterification techniques well known in the art. The polyesters can be prepared according to a procedure consisting of one or more reaction steps.

For the preparation of these polyesters a conventional reactor equipped with a stirrer, an inert gas (nitrogen) inlet, a thermocouple, a distillation column connected to a water-cooled condenser, a water separator and a vacuum connection tube are typically used.

The esterification conditions used to prepare the polyesters are conventional, namely a standard esterification catalyst, such as dibutyltin oxide, dibutyltin dilaurate, n-butyltin trioctoate, sulfuric acid or a sulphonic acid, is typically used in an amount from 0.05 to 1.50% by weight of the reactants and optionally, colour stabilisers, for example, phenolic antioxidants such as Irganox 1010 (Ciba) or phosphonite- and phosphite-type stabilisers such as tributylphosphite, can be added in an amount from 0 to 1% by weight of the reactants.

Polyesterification is generally carried out at a temperature which is gradually increased from 130° C. to about 190 to 250° C., first under normal pressure, then, when necessary, under reduced pressure at the end of each process step, while maintaining these operating conditions until a polyester with the desired hydroxyl and/or acid number is obtained. The degree of esterification is typically monitored by determining the amount of water formed in the course of the reaction and the properties of the obtained polyester, for example, hydroxyl number, acid number, and viscosity.

(Optional) Second polyesters B1, thus obtained, can be further reacted with a monoepoxide such as for example ethylene oxide, propylene oxide, monocarboxylic acid glycidyl ester (e.g. Cardura E) and/or phenylglycidyl ether, or with a monoisocyanate such as n-butyl isocyanate, dodecyl isocyanate, octadecyl isocyanate, cyclohexyl isocyanate, benzyl isocyanate, and/or phenyl isocyanate, depending on whether the polyester is carboxyl functional or hydroxyl functional.

Rheological agents such as Rheocin R (Ashland), AC 540A (Honeywell), Disparlon PL-525 (Kusumoto), flow control agents such as Resiflow PV5 (Worlee), Modaflow (Cytec Surface Specialities), Acronal 4F (BASF), UV-light absorbers such as Tinuvin 900 (Ciba), hindered amine light stabilisers represented by Tinuvin 144 (Ciba), other stabilising agents such as Tinuvin 312 and 1130 (Ciba), antioxidants such as Irganox 1010 (Ciba) and stabilisers from the phosphonite or phosphite type can be added to one or more of the polyesters (A and/or B1) of the present invention, during or after synthesis, more particular when the polysters are still in the molten stage.

By crystalline "polycarboxylic acids" B2 is meant to designate linear or branched aliphatic chain compounds having a plurality of carboxylic acid groups. Preferably the compound is linear and preferably the compound has 2 carboxylic acid groups. Preferably this compound B2 is selected from one or more of: adipic acid, glutaric acid, pimelic acid, suberic acid, azelaic acid, sebacic acid, 1,10-decanedioic acid, 1,11-undecanedioic acid, 1,12-dodecanedioic acid, 1,13-triadecanedioic acid, 1,14-tetradecanedioic acid, 1,15-pentadecanedioic acid, and/or the corresponding anhydrides. More preferably this compound B2 is selected from glutaric acid, pimelic acid, sebacic acid, 1,12-dodecanedioic acid, and/or the corresponding anhydrides. Particularly suited is 1,12-dodecanedioic acid. Preferably this compound B2 has an acid number between 410 and 850 mg KOH/g. Preferably the acid number of this compound B2 is at least 450 and preferably at most 600 mg KOH/g.

Preferably the total amount of compounds B1 and/or B2 is from 0.5 to 20% by weight, based on the total weight of the binder. Preferably the total amount of compounds B1 and/or B2 is at least 2% and preferably at most 15% by weight, based on the total weight of the binder.

Preferably the component B of the invention comprises at least one second polyester B1 of the invention, possibly in combination with a crystalline polycarboxylic acid B2 of the invention. Advantageously the component B of the invention comprises (or consists of) from 2.5 to 100% by weight, relative to the total amount B1+B2, of the second polyester B1; and from 0 to 50% by weight, relative to the total amount B1+B2, of the crystalline polycarboxylic acid B2. Preferably this component B comprises (or consists of) at least 10% by weight, relative to the total amount B1+B2, of the second polyester B1. Preferably this component B comprises (or consists of) of at least 5% and preferably at most 35% by weight, relative to the total amount B1+B2, of the crystalline polycarboxylic acid B2. Preferably the compound B1 of the invention bears carboxylic acid groups and has a glass transition temperature of less than +45° C. Preferably the compound B2 of the invention has an acid number between 410 and 850 mg KOH/g, more preferably between 450 and 600 mg KOH/g.

The glycidyl group containing acrylic copolymers C of the invention in general have an epoxy equivalent weight (EEW) of from 100 to 1500 gram of polymer per equivalent of epoxy. Preferably the EEW of this compound C is at least 200 gram of polymer per equivalent of epoxy. Preferably the EEW of this compound C is at most 1000, more in particular at most 600 gram of polymer per equivalent of epoxy.

The glycidyl group containing monomer used in the acrylic copolymer of the present invention in general is used in mole percentages ranging from 1 to 95 and advantageously is selected from, for example glycidyl acrylate, glycidyl methacrylate, methyl glycidyl methacrylate, methyl glycidyl acrylate, 3,4-epoxycyclohexylmethyl(meth)acrylate, 1,2-ethyleneglycol glycidylether(meth)acrylate, 1,3-propyleneglycolglycidylether(meth)acrylate, 1,4-butyleneglycolether(meth)acrylate, 1,6-hexanediolether(meth)acrylate, 1,3-(2-ethyl-2-butyl)-propanediolglycidylether(meth)acrylate and acrylic glycidyl ether.

The other monomers copolymerisable with the epoxy group containing monomer in general are used in mole percentages ranging from 5 to 99 and advantageously are selected from methyl(meth)acrylate, ethyl(meth)acrylate, propyl(meth)acrylate, n-butyl(meth)acrylate, isobutyl(meth)acrylate, tert.butyl(meth)acrylate, 2-ethylhexyl(meth)acrylate, stearyl(meth)acrylate, tridecyl(meth)acrylate, cyclohexyl(meth)acrylate, n-hexyl(meth)acrylate, benzyl(meth)acrylate, phenyl(meth)acrylate, isobornyl(meth)acrylate, nonyl(meth)acrylate, hydroxyethyl(meth)acrylate, hydroxypropyl(meth)acrylate, hydroxybutyl(meth)acrylate, 1,4-butandiol mono(meth)acrylate, the esters of methacrylic acid, maleic acid, maleic anhydride, itaconic acid, dimethylaminoethyl(meth)acrylate, diethylaminoethyl(meth)acrylate, styrene, α-methylstyrene, vinyltoluene, (meth)acrylonitrile, vinylacetate, vinylpropionate, acrylamide, methacrylamide, methylol(meth)acrylamide, vinylchloride, ethylene, propylene, C4-20 olefins and α-olefins. They can be used by themselves or in combination of two or more.

The glycidyl group containing acrylic copolymer C of the invention in general has a number average molecular weight, as measured by GPC, in the range of from 2000 to 8000. Preferably the Mn of compound C is at least 2500, more preferably at least 3000. Preferably the Mn of compound C is at most 6000, more preferably at most 5000.

The glycidyl group containing acrylic copolymer C of the invention in general has a glass transition temperature (Tg), measured by DSC, in the range of from 35 to 120° C. Preferably the Tg is at least 40° C. and preferably at most 100° C.

The glycidyl group containing acrylic copolymer C of the invention in general has a Brookfield (cone/plate) viscosity ranging of from 1.000 mPa·s at 150° C. to 10.000 mPa·s at 200° C.

Preferably the Brookfield (cone/plate) viscosity of this compound C ranges of from 1.000 mPas at 175° C. to 5.000 mPa·s at 200° C.

The glycidyl group containing acrylic copolymer C of the invention can be prepared by conventional polymerisation techniques, either in mass, in emulsion, or in the solution of an organic solvent. The nature of the solvent is of very little importance, provided that it is inert and that it readily dissolves the monomers and the synthesised copolymer. Suitable solvents include toluene, ethyl acetate, butyl acetate, xylene, etc. The monomers are typically copolymerised in the presence of a free radical polymerisation initiator (benzoyl peroxide, dibutyl peroxide, azo-bis-isobutyronitrile, and the like) in an amount representing 0.1 to 4.0% by weight of the monomers.

To achieve a good control of the molecular weight and its distribution, a chain transfer agent, preferably of the mercaptan type, such as n-dodecylmercaptan, t-dodecanethiol, iso-octylmercaptan, or of the carbon halide type, such as carbon tetrabromide, bromotrichloromethane, etc., may be added in the course of the reaction. The chain transfer agent advantageously is used in amounts of up to 10% by weight of the monomers used in the copolymerisation.

A cylindrical, double walled reactor equipped with a stirrer, a condenser, an inert gas (nitrogen, for example) inlet and outlet, and metering pump feeding systems is generally used to prepare the glycidyl group containing acrylic copolymer of the invention. Polymerisation is generally carried out under conventional conditions. Thus, when polymerisation is carried out in solution, for example, an organic solvent is first introduced into the reactor and heated to the refluxing temperature under an inert gas atmosphere (nitrogen, carbon dioxide, and the like) and a homogeneous mixture of the required monomers, the free radical polymerisation initiator and the chain transfer agent, when needed, is then generally added to the solvent gradually over several hours. The reaction mixture is then typically maintained at the indicated temperature for certain hours, while stirring. The solvent is then typically removed from the copolymer obtained in vacuo.

Preferably the glycidyl group containing acrylic copolymer C of the invention is present in an amount from 1% to 40% by weight, based on the total weight of the binder. Preferably this compound C is present in a amount of at least 2% and preferably at most 25%, by weight, based on the total weight of the binder.

The further compound and/or resin D having functional groups reactable with the carboxylic acid groups advantageously is different from compound C, more in particular is different from a glycidyl group containing acrylic copolymer. Preferably compound D is a glycidyl group containing resin and/or compound that is different from compound C. More in particular, compound D is a glycidyl group containing resin and/or compound other than a glycidyl group containing acrylic copolymer.

Preferably component D of the present invention is selected from glycidyl group containing polyphenoxy resins, such as Bisphenol A based epoxy resins.

Bisphenol A based epoxy resins are prepared from the reaction of Bisphenol A and epichlorohydrin, wherein the excess of epichlorohydrin determines the number average molecular weight of the epoxy resin. (for further information see W. G. Potter: Epoxide Resins, Springer-Verlag, New York 1970, Y. Tanaka, A. Okada, I. Tomizuka in C. A. May, Y. Tanaka (eds.): Epoxy Resins Chemistry and Technology, Marcel Dekker, New York 1973, chapter 2, pp. 9-134 which is hereby incorporated by reference).

Commercially available epoxy resins, such as Epikote 1055 from Hexion, Araldite GT7004 or Araldite ECN9699 from Huntsman, D.E.R.664 from Dow, Epon 2002 from Hexion etc., are typical examples of glycidyl group containing polyphenoxy compounds.

Other preferred components D that are solid at room temperature are for example compounds comprising (or consisting of) a glycidylester, more in particular a mixture of diglycidyl terephthalate and triglycidyl trimellitate, such as for example the epoxy resins commercially available from Huntsman under the trade designation Araldite PT910 and Araldite PT912. Advantageously the compound C of the invention represents 5 to 75% by weight of the total amount of C+D, and the component D of the invention represents 25 to 95% by weight of the total amount of C+D.

Preferably the compound and/or resin D of the invention is present in an amount of from 1% to 30% by weight, based on the total weight of the binder. Preferably this compound and/or resin D is present in an amount of at least 2% and preferably at most 25% by weight, based on the total weight of the binder.

The curing catalysts E which are added to the binder of the invention, in order to accelerate cross-linking reactions of the thermosetting powder composition during curing, are preferably selected from the amines (e.g. 2-phenylimidazoline), the phosphines (e.g. triphenylphosphine), the ammonium salts (e.g. tetrabutylammonium bromide or tetrapropylammonium chloride), the phosphonium salts (e.g. ethyltriphenylphosphonium bromide or tetrapropylphosphonium chloride) and the blocked catalysts such as for example acid blocked amine or phosphine catalysts or the encapsulated catalysts such as described in e.g. EP1348742.

Preferably the curing catalyst E of the invention is present in an amount of from 0.1% to 5% by weight, based on the total amount of the binder. Preferably the curing catalyst E of the present invention is present in an amount of at least 0.3% and preferably at most 2% weight, based on the total weight of the binder.

A particular embodiment of the invention relates to a thermosetting powder coating composition comprising as a binder a blend (or mixture) of:

From 40 to 97% by weight, and preferably from 60 to 85% by weight, of a carboxylic acid group containing first polyester A as defined above, the first polyester A preferably having a Tg of at least 45° C.;

From 0.5 to 20% by weight, and preferably from 2 to 15% by weight, of a component B as defined above;

From 1 to 40% by weight, and preferably from 2 to 25% by weight, of a glycidyl group containing acrylic copolymer C as defined above;

From 1 to 30% by weight, and preferably from 2 to 25% by weight, of a resin and/or compound D having functional groups reactable with the polyesters' carboxylic acid groups as defined above; and From 0.1 to 5% by weight, and preferably from 0.3 to 2% by weight, of a thermosetting curing catalyst E.

In the above, weight percentages are based on the total weight of the binder.

In addition to the components described above, constituting the binder, powder compositions of the invention can also include rheological agents such as Rheocin R (Ashland), AC 540A (Honeywell), Disparlon PL-525 (Kusumoto), flow control agents such as Resiflow PV5 (Worlee), Modaflow (Cytec Surface Specialities), Acronal 4F (BASF), etc., and degassing agents such as benzoin (BASF) etc. To the formulation tribo additives such as Additol P 950 (Cytec Surface Specialities), UV-light absorbers such as Tinuvin 900 (Ciba), hindered amine light stabilisers represented by Tinuvin 144 (Ciba), other stabilising agents such as Tinuvin 312 and 1130 (Ciba), antioxidants such as Irganox 1010 (Ciba) and stabilisers from the phosphonite or phosphite type can be added.

Both, pigmented systems as well as clear lacquers can be prepared.

A variety of dyes and pigments can be utilised in the composition of the invention. Examples of useful pigments and dyes are: metallic oxides such as titaniumdioxide, ironoxide, zincoxide and the like, metal hydroxides, metal powders, sulphides, sulphates, carbonates, silicates such as ammoniumsilicate, carbon black, talc, china clay, barytes, iron blues, leadblues, organic reds, organic maroons and the like.

The components of the composition according to the invention may be mixed by dry blending in a mixer or blender (e.g. drum mixer). The premix is then in general homogenised at temperatures of about 70 to 90° C. in a single screw extruder such as the BUSS-Ko-Kneter or a double screw extruder such as the PRISM or APV. The extrudate, when cooled down, is then typically grounded to a powder with a particle size ranging from 10 to 150 μm. The powdered composition may be deposed on the substrate by use of a powder gun such as an electrostatic CORONA gun or TRIBO gun. On the other hand well known methods of powder deposition such as the fluidised bed technique can be used.

After deposition the powder advantageously is heated to a temperature between 100 and 150° C., causing the particles to flow and fuse together to form a smooth, uniform, continuous coating on the substrate surface.

Advantageously powder coating compositions of the present invention permit to obtain coatings having a relative 60° gloss value, according to according to ASTM D523, of at least 55%, preferably at least 70%, more preferably at least 85%. Preferably the relative 60° gloss value is at most 100 for pigmented systems.

Another aspect of the invention relates to a process for coating substrates comprising the steps of coating at least one surface of said substrate with a powder coating composition of the invention; and heating the coated substrate to thermally cure the coating thereon to form an adherent layer of the coating composition on the substrate.

Powder coating compositions of the invention can be cured at temperatures of between 100 and 150° C. for a period of in general 5 to 50 minutes. Typical curing conditions are 18' at 140° C., 30' at 130° C. and 35' at 120° C. total curing time.

Powder coating compositions of the invention are suitable for coating heat-sensitive substrates such as wood, fibre board, in particular medium density fibreboard (MDF) pre-assembled parts, and plastics. In addition they are suitable for coating heavy metal pieces that otherwise would require extremely long curing times in order to get the coating fully cured. The invention also provides for an article obtained (or obtainable by) a method of the present invention.

Yet another aspect of the invention relates to an article coated—either partly or entirely—with a composition of the present invention.

The following examples are submitted for a better understanding of the invention without being restricted thereto.

Example 1

First Polyester A 370.66 parts of neopentyl glycol and 41.18 parts of ethylene glycol are placed in a conventional four neck round bottom flask equipped with a stirrer, a distillation column connected to a water cooled condenser, an inlet for nitrogen and a thermometer attached to a thermoregulator.

The flask contents are heated, while stirring under nitrogen, to a temperature of circa 140° C. at which point 563.62 parts of terephthalic acid, 62.62 parts of adipic acid and 2.25 parts of n-butyltin trioctoate are added. The reaction is continued at 240° C. under atmospheric pressure until about 95% of the theoretical amount of water is distilled and a transparent hydroxyl functionalised prepolymer is obtained.

To the first step prepolymer standing at 200° C., 110.94 parts of isophthalic acid are added. Thereupon, the mixture is gradually heated to 230° C. After a 2 hour period at 230° C. and when the reaction mixture is transparent, 0.90 parts of tributylphosphite is added and a vacuum of 50 mm Hg is gradually applied. After 3 hours at 230° C. and 50 mm Hg, following characteristics are obtained:

| | |
|---|---|
| AN | 33 mg KOH/g |
| Brfld$^{200°\ C.}$ (Cone/Plate) | 2300 mPa · s |
| Tg (DSC) | 53° C. |

Example 2 to Example 4

In the table below, the monomer composition as well as the final resin characteristics is reported for the polyesters of Example 2 to Example 4

TABLE 1

| | Example 2 Polyester A | Example 3 Polyester B1 | Example 4 Polyester B1 |
|---|---|---|---|
| Terephthalic acid | 659.69 | | 629.39 |
| Adipic Acid | 74.96 | | 86.97 |
| Dodecanedioic acid | | 890.36 | |
| Neopentyl glycol | 374.11 | | 428.80 |
| Ethylene glycol | 41.57 | 245.48 | |
| Cardura E | | | 60.96 |
| AN (mg KOH/g | 27 | 22 | 15 |
| OHN (mg KOH/g | 2 | 33 | 17 |
| Visc (mPas at temp ° C.) | 4000$^{(200°\ C.)}$ | 350$^{(100°\ C.)}$ | 7700$^{(175°\ C.)}$ |
| Tg/Tm (° c.) | 53$^{(Tg)}$ | −31$^{(Tg)}$/82$^{(Tm)}$ | 39$^{(Tg)}$ |

In Examples 2 to 4, the condensation is catalysed using 0.25% weight of of n-butyltin trioctoate; 0.1% weight of tributylphosphite is added before the vacuum step.

For Example 2 and Example 4, the adipic acid is added in a second step to the hydroxyl functional first step prepolymer obtained from the condensation of terephthalic acid and a mixture of neopentyl glycol and ethylene glycol.

For Example 4, Cardura E is added to the carboxyl functional polyester obtained in a 2-step process.

The reaction of Cardura E with the carboxylic acid groups of the second step carboxyl-functional polyester is done at about 180° C. in the presence of 0.5% weight of Ethyltriphenylphosphonium bromide.

To the polyesters of Example 1 and 2, at the end of the second step, is added 0.5% by weight of Ethyltriphenylphosphonium bromide.

Example 5

Glycidyl Group Containing Acrylic Copolymer C

Step 1: 384.6 weight parts of n-butylacetate were brought in a reactor under mild nitrogen overflow conditions and heated to 125° C. The temperature was measured in the solvent and regulated at 125° C.

Two additions were carried out in parallel:
*addition M of the monomers consisting of 40.14 parts styrene, 296.15 parts glycidylmethacrylate, 53.41 parts isobutylmethacrylate, 91.06 parts of methyl methacrylate.
*addition I of the initiator TRIGONOX®C (38.46 parts) solubilised in another 96.15 parts of n-butylacetate.

Once the temperature reached 125.0° C., addition I was started, which takes 215 minutes till the end of the addition. 5 minutes after the start of the addition I, addition M was started which takes 180 minutes. After ending the addition I the reaction mixture was kept another 100 minutes at 125° C. and then heated for stripping at 175° C. at a reduced pressure of 600 mbar during 30 minutes. After these 30 minutes, the temperature was kept at 175° C. but the pressure was reduced to 50 mbar for another 90 minutes.

The obtained copolymer was characterised by Mn: 2700; Mw: 8400 (GPC); Tg (DSC): 45° C.; EEW(g/eq): 855 and Brfld visc. at 175° C.: 6530. mPa·s.

Example 6

The polyesters and the acrylic copolymer, as illustrated above, are then formulated to a powder accordingly to the formulation as mentioned below.

| White paint formulation | |
|---|---|
| Binder | 69.06 |
| Kronos 2310 | 29.60 |
| Modaflow | 0.99 |
| Benzoin | 0.35 |

The binder composition of the different powder formulations, according to the invention, is given in the table below:

TABLE 2

| | Bind 1 | Bind 2 | Bind 3R | Bind 4R | Bind 5R |
|---|---|---|---|---|---|
| Ex 1 | | | | | 83.2 |
| Ex 2 | 76.8 | 80.9 | 80.8 | 71.8 | |
| Ex 3 | 4.0 | | 4.2 | | |
| Ex 4 | | 9.0 | | 12.7 | |
| Ex 5 | 2.2 | 5.3 | 15.0 | 15.5 | 16.8 |
| DDDA | | 2.0 | | | |
| GT 7004 | 20.0 | | | | |
| PT 910 | | 2.8 | | | |

GT 7004: type-3 Bisphenol A-based epoxy resin
PT910: glycidyl group containing compound consisting of 75% weight of diglycidyl terephthalate and 25% weight of triglycidyl trimellitate.
DDDA: Dodecanedioic acid The powders (Powder 1 to 5 obtained from Binder 1 to 5 respectively) are prepared first by dry blending of the different components and then by homogenisation in the melt using a PRISM 16 mm L/D 15/1 twin screw extruder at an extrusion temperature of about 80° C. The homogenised mix is then cooled and grinded in an Alpine. Subsequently the powder is sieved to obtain a particle size between 10 and 110 μm. The powder thus obtained is deposited on cold rolled steel with a thickness of 0.8 mm, by electrostatic deposition using the GEMA-Volstatic PCG 1 spraygun. At a film thickness of about 70 μm the panels are transferred to an air-ventilated oven, where curing proceeds for 15 minutes at a temperature of 140° C.

The paint characteristics for the finished coatings obtained from a binder according to the invention (Powd 1 and Powd 2), are given in table 3.

In the same table is given, as a comparative example (Powd 5R), the paint performances of a finished coating obtained from a binder based on a carboxyl group containing polyester and a glycidyl group containing acrylic copolymer, as for example claimed in EP 38635. Powd 3R and 4R represent other comparative examples prepared from coating compositions comprising compound B1 yet not compound D.

Column 1: indicates the identification number of the formulation/powder

Column 2: indicates the sixty degree gloss, measured according to ASTM D523

Column 3: indicates the visual evaluation where 10 stands for very smooth high gloss coating and 0 stands for strong orange peel coating with a reduced gloss 60° value Column 4: indicates the reverse impact strength (RI) and the direct impact strength (DI) according to ASTM D2794. the highest impact which does not crack the coating is recorded in kg·cm.

Column 5: indicates the pencil hardness according to the scratch Hardness Tester according to Wolff-Wilborn.

Column 6: indicates the resistance to MEK, which corresponds to the number of twofold rubbing movements (to and fro) with a cotton pad impregnated with MEK which does not detrimentally affect the appearance of the surface of the cured film.

TABLE 3

| ID | Gloss 60° | Visual Evaluation | RI/DI (kg.cm) | Pencil Hardness | MEK resistance |
|---|---|---|---|---|---|
| Powd 1 | 90.0 | 9 | 200/180 | F | >100 |
| Powd 2 | 85.9 | 9 | 200/200 | F | >100 |
| Powd 3R | 89.5 | 6 | 200/200 | F | >100 |
| Powd 4R | 91.5 | 5 | 200/200 | H | >100 |
| Powd 5R | 77.0 | 4 | 80/80 | 2H | >100 |

Powd 1 and Powd 2 are accordingly the invention.
Powd 3R and Powd 4R (Comparative Examples) comprise the compound B1 yet do not comprise compound D.
Powd 5R (Comparative Example) only comprises compounds A and C.

The powders accordingly the invention (Powd 1 and Powd 2) prove to produce nice smooth coatings proving full flexibility and solvent resistance upon curing at 130° C. for 25 min. and at 120° C. for 35 min. respectively.

Besides an outstanding flexibility and flow the powder coating compositions of the invention prove to satisfy an excellent outdoor resistance comparable to the currently used nowadays standard commercial polyester based powders.

Weathering measurements are conducted in a very severe environment, i.e. the Q-UV accelerated weathering tester (Q-Panel Co) according to ASTM G53-88 (standard practice for operating light and water exposure apparatus—fluorescent UV/condensation type—for exposure of non metallic materials).

Thereto, coated panels have been subjected to the intermittent effects of condensation (4 hours at 50° C.) as well as the damaging effects of sunlight simulated by fluorescent UV-A lamps (340 nm, I=0.77 W/m$^2$/nm) (8 hours at 60° C.). For this type of lamps a good correlation with natural sunlight is observed. The panels used in the Q-UV are chromated aluminium ones.

The coating formulations (Powder 1' to 6' wherein Binder equals Binder 1 to 6 respectively) used to evaluate accelerated weathering are RAL 8014 dark brown formulations for which the composition is given below

| Brown paint formulation | |
|---|---|
| Binder | 78.33 |
| Bayferrox 130 | 4.44 |
| Bayferrox 3950 | 13.80 |
| Carbon Black FW2 | 1.09 |
| Resiflow PV5 | 0.99 |
| Benzoin | 0.35 |

The relative 60° gloss values, according to ASTM D523, is recorded every 400 hours at least till gloss reductions until 50% of the maximum value is obtained.

For all brown coatings obtained from powder formulations (Powder 1' to 5') between 2200 and 2500 hours of QUV-A exposure are needed in order to get a 50% gloss reduction.

The invention claimed is:

1. A powder coating composition for low temperature cure which comprises a mixture of:
   at least one carboxylic acid group containing first polyester A that is amorphous and that has a glass transition temperature of from +45 to +100° C.;
   at least one component B that consists of at least one of
      at least one second polyester B1 different from the first polyester A having a functionality lower than 2 and having a glass transition temperature ≤+45° C. and
      at least one crystalline polycarboxylic acid B2;
   at least one glycidyl group containing acrylic copolymer C with a number average molecular weight of from 2000 to 8000 Daltons;
   at least one compound and/or resin D, different from compound C, having functional groups reactable with the carboxylic acid groups; and
   at least one thermosetting curing catalyst E.

2. The coating composition of claim 1 wherein compound A has an acid number of from 20 to 50 mg KOH/g and a hydroxyl number of less than 15 mg KOH/g.

3. The coating composition of claim 1 wherein component B consists of the at least one second polyester B1 and, optionally, the at least one crystalline polycarboxylic acid B2.

4. The coating composition of claim 1 wherein component B comprises from 2.5 to 100% by weight, relative to the total amount B1+B2, of the second polyester B1, and from 0 to 50% by weight, relative to the total amount B1+B2, of the crystalline polycarboxylic acid B2.

5. The coating composition of claim 1 wherein the second polyester B1 is selected from the group consisting of:
   a. a polyester comprising carboxylic acid groups, optionally further reacted with a monoepoxide
   b. a polyester comprising hydroxyl groups, optionally further reacted with a monoisocyanate and/or
   c. an uncondensed polyester optionally comprising carboxylic acid groups.

6. The coating composition of claim 1 wherein the crystalline polycarboxylic acid B2 is selected from one or more of: adipic acid, glutaric acid, pimelic acid, suberic acid, azelaic acid, sebacic acid, 1,10-decanedioic acid, 1,11-undecanedioic acid, 1,12-dodecanedioic acid, 1,13-tridecanedioic acid, 1,14-tetradecanedioic acid, 1,15-pentadecanedioic acid, and/or their corresponding anhydrides.

7. The coating composition of claim 6 wherein said compound B2 has an acid number of between 410 and 850 mg KOH/g.

8. The coating composition of claim 1 wherein compound C has an epoxy equivalent weight (EEW) of from 200 to 1000 gram of polymer per equivalent of epoxy.

9. The coating composition of claim 1 wherein component D is a glycidyl group containing resin and/or a compound other than a glycidyl group containing acrylic copolymer.

10. The coating composition of claim 1 wherein the compound C represents 5 to 75% by weight of the total amount of C+D, and the component D represents 25 to 95% by weight of the total amount of C+D.

11. The coating composition of claim 1 wherein the thermosetting curing catalyst E is selected from the group consisting of amines; phosphines; ammonium salts; phosphonium salts; blocked amine or phosphine catalysts; and/or encapsulated catalysts.

12. The coating composition of claim 1 comprising as a binder a mixture of:
   from 40 to 97% by weight of the carboxylic acid group containing first polyester A as defined above, said first polyester A having a Tg of at least 45° C.;
   from 0.5 to 20% by weight of component B as defined above;
   from 1 to 40% by weight of the glycidyl group containing acrylic copolymer C as defined above;
   from 1 to 30% by weight of the resin and/or compound D having functional groups reactable with the polyesters' carboxylic acid groups as defined above; and
   from 0.1 to 5% by weight of the thermosetting curing catalyst E as defined above.

13. A process for coating substrates comprising the steps of coating at least one surface of said substrate with a powder coating composition of claim 1; and heating the coated substrate to thermally cure the coating thereon to form an adherent layer of the coating composition on the substrate.

14. An article coated, either partly or entirely, with a coating composition of claim 1.

15. The coating composition of claim 3 wherein the composition further comprises at least one crystalline polycarboxylic acid B2.

16. A powder coating composition for low temperature cure which comprises a mixture of:
   from 40 to 97% by weight of at least one carboxylic acid group containing first polyester A that is amorphous and that has a glass transition temperature of from +45 to +100° C.;
   from 0.5 to 20% by weight of at least one component B comprising at least one crystalline polycarboxylic acid B2;
   from 1 to 40% by weight of at least one glycidyl group containing acrylic copolymer C with a number average molecular weight of from 2000 to 8000 Daltons;
   from 1 to 30% by weight of at least one compound and/or resin D, different from compound C, having functional groups reactable with the carboxylic acid groups; and
   from 0.1 to 5% by weight of at least one thermosetting curing catalyst E.

17. The powder coating composition of claim 16 wherein the composition further comprises at least one at least one second polyester B1 different from the first polyester A having a glass transition temperature ≤+45° C.

18. The powder coating composition of claim 17 wherein the second polyester B1 has a functionality lower than 2.

19. The powder coating composition of claim 1 wherein the carboxylic acid group containing first polyester A is prepared from an acid constituent that is composed of from 50 to 100 molar percent of terephthalic and/or isophthalic acid and from a glycol constituent that is composed of from 40 to 100 molar percent of neopentyl glycol.

20. A powder coating composition for low temperature cure which comprises a mixture of:
   at least one carboxylic acid group containing first polyester A;
   at least one component B that consists of
      at least one second polyester B1 different from the first polyester A having a functionality lower than 2 and having a glass transition temperature ≤+45° C. and, optionally,
      at least one crystalline polycarboxylic acid B2;
   at least one glycidyl group containing acrylic copolymer C with a number average molecular weight of from 2000 to 8000 Daltons;
   at least one compound and/or resin D, different from compound C, having functional groups reactable with the carboxylic acid groups; and
   at least one thermosetting curing catalyst E.

21. The coating composition of claim 20 wherein component B consists of the at least one second polyester B1 and the at least one crystalline polycarboxylic acid B2.

22. The coating composition of claim 20 wherein component B comprises from 2.5 to 100% by weight, relative to the total amount B1+B2, of the second polyester B1, and from 0 to 50% by weight, relative to the total amount B1+B2, of the crystalline polycarboxylic acid B2.

* * * * *